United States Patent [19]

Heitzman

[11] 3,729,976
[45] May 1, 1973

[54] METHOD AND APPARATUS FOR STRAIGHTENING SAWS

[76] Inventor: Russell A. Heitzman, 5005 Kenway Drive, Tillamook, Oreg. 97141

[22] Filed: Dec. 28, 1970

[21] Appl. No.: 101,657

[52] U.S. Cl. ......................72/389, 29/401, 72/479, 76/112
[51] Int. Cl. ...............................................B21d 3/16
[58] Field of Search.......................72/389, 380, 385, 72/386, 387, 388, 379, 358, 479; 76/112; 29/401

[56] References Cited

UNITED STATES PATENTS

| 2,153,992 | 4/1939 | Prochaska | 72/385 |
| 919,206 | 4/1909 | Newlin | 72/387 |
| 2,155,160 | 4/1939 | Bruno | 72/389 |
| 3,146,819 | 9/1964 | Van Endert | 72/389 |

*Primary Examiner*—Charles W. Lanham
*Assistant Examiner*—Gene P. Crosby
*Attorney*—Eugene D. Farley

[57] ABSTRACT

A saw having a deformation extending laterally with respect to the plane of the saw is straightened by placing it on bearing means bearing against one face of the saw on opposite sides of the deformation. Pressure is applied against the deformation on the face of the saw opposite the face against which the bearing means are applied. Sufficient pressure is applied to bend the deformation into the plane of the saw, without thinning or otherwise altering the saw thickness.

9 Claims, 4 Drawing Figures

Patented May 1, 1973 3,729,976
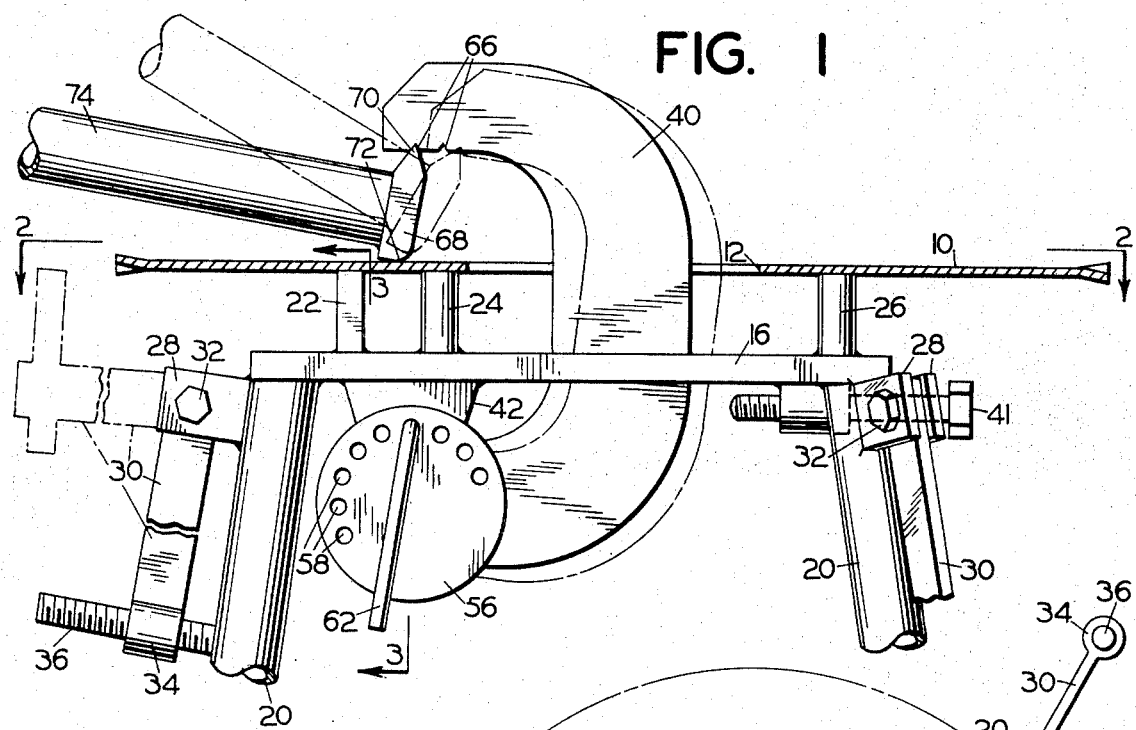
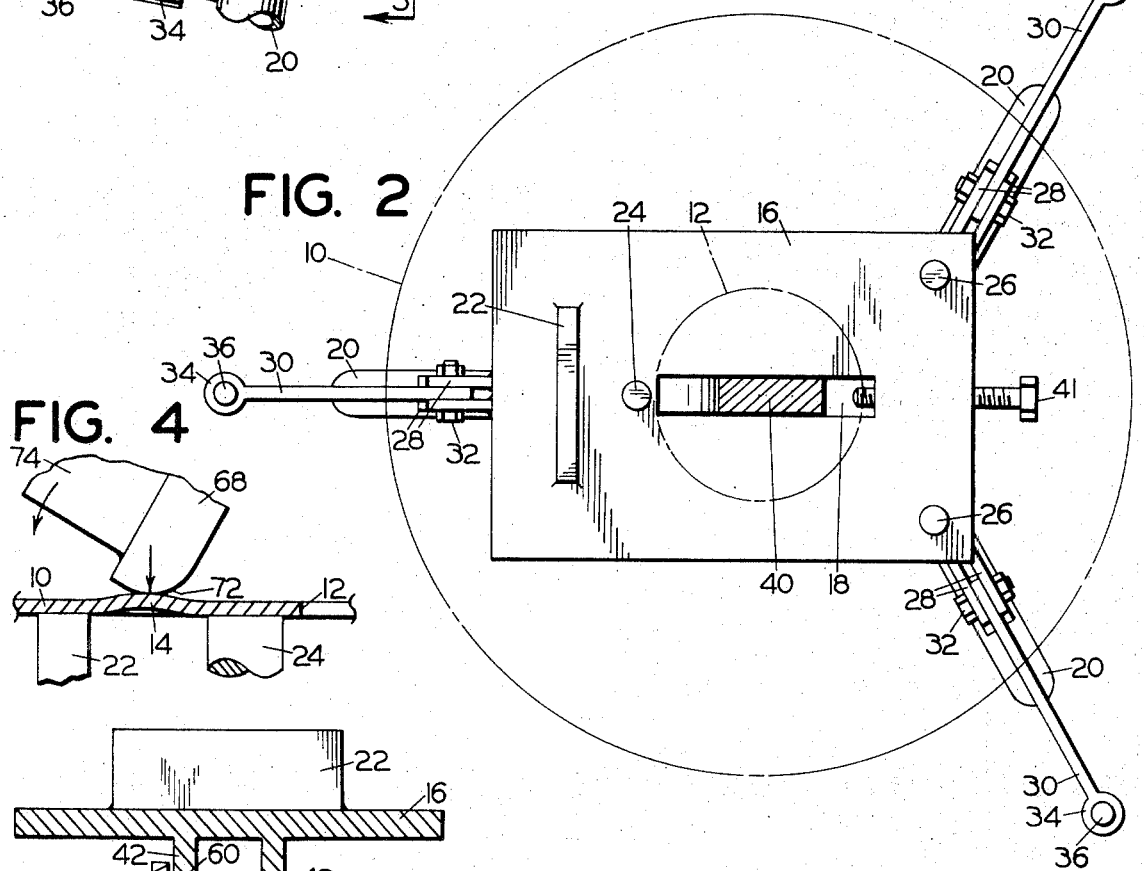
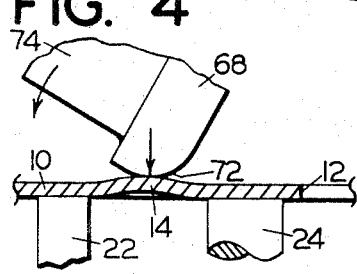
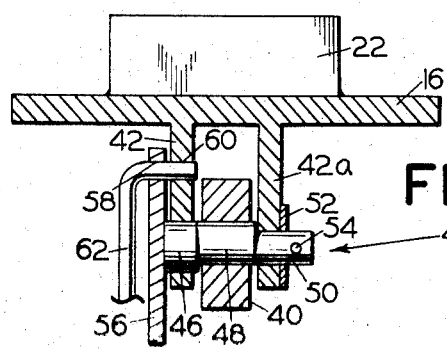
RUSSELL A. HEITZMAN
INVENTOR.
BY Eugene D. Farley
ATTY.

METHOD AND APPARATUS FOR STRAIGHTENING SAWS

This invention relates to method and apparatus for straightening saws. It relates particularly to method and apparatus for straightening circular saws provided with a central eye and is described herein with reference to saws of this class, although no limitation thereby is intended since the invention is applicable also to straight saws and in general to various articles made of flat, deformable sheet material.

A circular saw is designed and stretched to operate at one speed. Only at this speed does the saw run true. This is the case because even a large circular saw having a diameter of several feet when at rest is not flat, but is hemispherical, or dished, on one side or the other. The degree of curvature varies with the diameter of the saw.

When a circular saw in good condition is started up, it wobbles during the early stages of its acceleration. This occurs because as the saw speed increases, the resulting centrifugal force causes a periodic flattening of the originally dished saw from one side to the other. As the saw speed increases, the centrifugal force increases correspondingly and gradually overcomes the stress of the dishing. When the saw is at its prescribed operating speed, the wobbling effect ceases and the saw runs straight and true, since at this speed it is stressed uniformly.

However, during operation of the saw it encounters knots, splits and other obstacles which gradually deform the saw in the area of the saw eye. The resulting deformation is substantially constant in cross section, closely adjacent to and a constant distance from the eye.

In the past this deformation has been straightened by hammering the saw. However, the hammering action stretches the metal and eventually destroys the hemispherical curvature of the saw with the result that the saw no longer will run true.

It is the object of the present invention to provide method and apparatus for straightening saws which overcomes the foregoing problem and provides a means for quickly and accurately straightening the saw to its original hemispherical contour, thereby improving its performance and greatly lengthening its service life.

I have discovered that the forgoing object may be achieved by a method which comprises placing a saw having a laterally extending deformation on spaced bearing means bearing against one face of the saw on opposite sides of the deformation. Pressure is applied against the deformation on the face of the saw opposite the face to which the bearing means are applied. The magnitude of pressure thus applied is sufficient to bend the deformation into the plane of the saw without substantial alteration of the saw thickness. This returns the saw to its desired hemispherical condition, without stretching the metal or otherwise malforming the saw with resultant interference with the saw tension.

In the drawings:

FIG. 1 is a view in side elevation of the herein described saw straightening apparatus illustrating its manner of application to a circular saw;

FIG. 2 is a sectional view taken along line 2—2 of FIG. 1;

FIG. 3 is a detail sectional view taken along line 3—3 of FIG. 1; and

FIG. 4 is a detail fragmentary view in side elevation, illustrating the manner of operation of the apparatus.

In the illustrated preferred embodiment of the herein described saw straightening apparatus, the application of the apparatus is illustrated with reference to straightening a circular saw 10 provided in the usual manner with a central eye 12 and having a laterally extending deformation 14, FIG. 4, the deformation extending laterally with respect to the plane of the saw.

The apparatus includes a horizontal table 16 having a central opening 18. The table is suitably supported, as by means of a plurality of legs 20. Its upper face mounts bearing means which bear against the face of saw 10 when the latter is in its operative position on the table, with saw eye 12 substantially registering with table opening 18.

The bearing means employed comprise a bar 22 and a spaced post 24. The spacing between these two bearing elements is such that the saw may be positioned with deformation 14 located in the space between the two bearings, as again is illustrated in FIG. 4.

Since, in the normal operation of the saw the deformation occurs adjacent the saw eye, the saw will be supported in the vicinity of the eye by bearings 22, 24. It is further supported in the same area by means of supplemental post 26 diametrically opposite the bearing supports, on the opposite side of the eye.

If the saw is several feet in diameter, it is supported in the peripheral areas by means of auxiliary supports, the construction of which is illustrated in FIGS. 1 and 2.

Each table leg 20 mounts a pair of spaced, laterally extending tabs 28. An arm 30 having a length determined by the saw diameter is inserted between each pair of tabs. A bolt 32 penetrates tabs 28 and the interleaved inner end of arm 30. This pivotally mounts the arm and enables adjustments between the raised and lowered positions illustrated in FIG. 1.

The outer end of arm 30 mounts a threaded sleeve 34 into which is threaded an adjustable post 36. This post, as well as those on the cooperating arms, may be adjusted so that it contacts and supports the under face of saw 10 in the peripheral area of the saw.

On the support thus provided there is mounted pressure applying means positioned to bear against the deformation on the face of the saw opposite the face against which bearing supports 22, 24 are applied. In the illustrated form of the invention, such means includes a C-shaped yoke 40 made of heavy metal or other strong, structural material.

Yoke 40 is dimensioned to penetrate saw eye 12 and table opening 18 and to receive between its ends the inner margin of the saw which contains deformation 14.

The yoke is mounted for angular movement so that it may be adjustably positioned with respect to the work, and to a rest stop 41.

To this end there are provided on the under face of table 16, opposite bearing supports 22, 24, a pair of spaced, depending brackets 42, 42a. The outer ends of the brackets are provided with bearing openings and receive an eccentric, stepped shaft 44. Shaft 44 is shaped with an enlarged section 46 which is received in the bearing opening of bracket 42, an intermediate yoke-supporting eccentric section 48, and a terminal section 50 which is received in the bearing opening of bracket 42a. The shaft is releasably mounted in the bearing openings by means of a washer 52 retained by a pin or cotter key 54, with yoke 40 mounted on eccentric section 48.

The other end of shaft 44 is provided with an adjustment wheel 56. This has a plurality of radially spaced openings 58 which register upon rotation of the wheel with a cooperating opening 60 in the adjacent bracket 42.

An angular pin 62 is dimensioned for insertion in registering openings 58, 60 in a selected position of adjustment of wheel 56. Shaft 44 thus may be maintained in a selected position of adjustment of eccentric section 48. This in turn positions the yoke 40 as necessary to accommodate a saw of a particular thickness and deformations of varying extent.

Yoke 40 serves as fulcrum support. The inner surface of its upper end is formed with one or more fulcrum recesses or notches 66. These cooperate with lever means for applying bending pressure to deformation 14 in the manner illustrated in FIGS. 1 and 4.

The lever means employed comprises a pressure-applying head 68 having on one end a pivot 70 dimensioned to be received in notch 66, and on the other end an arcuate bearing surface 72 which in operation of the lever bears against the upper surface of deformation 14. A handle 74 of length sufficient to bring the desired pressure to bear is fixed to the central portion of head 68, preferably substantially at right angles thereto.

The combination thus serves as a lever wherein notch 66 acts as the fulcrum, pointed end 70 of head 68 acts as the pivot, and rounded end 72 of head 68 serves as the pressure-applying member.

OPERATION

The operation of the herein described saw straightening apparatus is as follows:

A saw 10 is placed on bearing supports 22, 24, 26 with yoke-shaped fulcrum support 40 penetrating the saw eye in the manner indicated in FIG. 1. As shown in FIG. 4, the supports 22, 24, 26 engage the side of the saw which contains the concave surface of the deformation 14.

The position of support 40 is adjusted by angular movement of eccentric shaft 44 on which it is pivotally mounted, to conform to the saw thickness. It is locked in position by means of lock pin 62.

If the saw is of substantial diameter, auxiliary support arms 30 are raised to their elevated position of FIG. 1. In this position posts 36 underlie and support the peripheral area of the saw. They are maintained in position by tightening bolts 32. Bearing posts 22, 24 now underlie and bear against the lower surface of the saw on opposite sides of deformation 14, FIG. 4.

The head 68 of lever 74 next is arranged with pivot 70 engaging fulcrum 66 of the fulcrum support and bearing surface 72 engaging the upper, or convex surface of deformation 14. Bending pressure is applied to the deformation by manipulation of lever 74, the movement accompanying this manipulation being accommodated by pivoting of yoke 40 on its shaft 44. It is to be observed that the pressure exerted is purely a bending pressure, as opposed to a hammering pressure. It accordingly displaces the bent portion of the saw into the plane of the saw without thinning the metal or otherwise introducing damaging stresses which would interfere with the saw tension. Where the saw is somewhat resilient it may be necessary to displace the deformed area beyond the plane of the saw sufficiently so that it springs back into its true position in the plane of the saw.

After one portion of the deformation has thus been pressed into its proper position in the plane of the saw, lever 74 is elevated to its dotted line position of FIG. 1, the position of the work shifted and the operation repeated. This sequence is repeated as often as necessary until the saw has been completely straightened, a result which may be accomplished rapidly and without damage to the saw.

Having thus described my invention in preferred embodiments, I claim:

1. The method of straightening a saw having a laterally extending deformation, the method comprising:
    a. placing the saw on spaced bearing means bearing against one face of the saw on opposite sides of the deformation, said face containing a concave surface of the deformation, and
    b. applying pressure against a convex surface of the deformation centrally of the spaced bearing means,
    c. the pressure applied being sufficient to bend the deformation into the plane of the saw without substantial alteration of the saw thickness.

2. Apparatus for straightening saws having a laterally extending deformation, the apparatus comprising:
    a. spaced bearing means bearing against one face of the saw on opposite sides of the deformation, and
    b. pivoted pressure applying means positioned to bear pivotally against the deformation and mounted for pivotal movement toward and centrally of the spaced bearing means,
    c. the pressure applying means having the capacity to exert a pressure sufficient to bend the deformation into the plane of the saw without substantial alteration of the saw thickness.

3. Apparatus for straightening saws having a laterally extending deformation, the apparatus comprising:
    a. spaced bearing means bearing against one face of the saw on opposite sides of the deformation, and
    b. pressure applying means positioned to bear against the deformation on a face of the saw opposite the face against which the bearing means are applied, the pressure applying means comprising a pressure-applying head of strong, structural material having at one end a bearing positioned for bearing against the deformation and on the other end a pivot, fulcrum means receiving the pivot in pivoting relation, and a lever connected to the head,
    c. the pressure applying means having the capacity to exert a pressure sufficient to bend the deformation into the plane of the saw without substantial alteration of the saw thickness.

4. The apparatus of claim 3 wherein the fulcrum means comprises a C-shaped yoke dimensioned to receive the saw between its ends and having on one end said fulcrum engaging the pivot and on the other end pivotal mounting means for pivotally mounting it on a structural member.

5. The apparatus of claim 3 wherein the fulcrum means comprises a C-shaped yoke dimensioned to receive the saw between its ends and having on one end said fulcrum engaging the pivot and on the other end pivotal mounting means for pivotally mounting it on a structural member, the pivotal mounting means comprising an eccentric shaft received in the end of the fulcrum means, adjusting means connected to the shaft for rotating it and thereby positioning the fulcrum means relative to the pressure-applying head, and lock means associated with the adjusting means for releasably locking the shaft in its selected position of adjustment.

6. The apparatus of claim 3 wherein the fulcrum means comprises a C-shaped yoke dimensioned to receive the saw and having on one end said fulcrum engaging the pivot and on the other end pivotal mounting means for pivotally mounting it on a structural member, and including adjustable stop means positioned adjacent the fulcrum means for arresting its pivotal movement at a predetermined position.

7. The apparatus of claim 6 wherein the adjustable stop means comprises a stop bolt threaded into a threaded support therefor.

8. The apparatus of claim 3 wherein the apparatus is applicable for straightening a circular saw having a central eye and including a table having a central opening substantially aligned with the eye, substantially C-shaped fulcrum means received within the opening of the table and the eye of the saw, the spaced bearing means being fixed to and extending upwardly from the table adjacent the opening therein, pivotal mounting means on the underside of the table pivotally mounting one end of the fulcrum means, the other end of the fulcrum means thereupon being positioned above the table means in operative relation to the pressure applying means.

9. Apparatus for straightening saws having a laterally extending deformation, the apparatus comprising:
   a. spaced bearing means bearing against one face of the saw on opposite sides of the deformation,
   b. pressure applying means positioned to bear against the deformation on the face of the saw opposite the face against which the bearing means are applied,
   c. the pressure applying means having the capacity to exert a pressure sufficient to bend the deformation into the plane of the saw without substantial alteration of the saw thickness, and
   d. saw support means positioned for supporting a large saw during operation of the pressure applying means, the saw support means comprising a plurality of arms, means for pivotally mounting the arms radially of the saw adjacent the same, and a plurality of pins mounted one on the end of each arm, the arms being adjustable between raised, operative positions wherein the pins engage the saw surface and lowered, inoperative positions wherein the pins are out of contact therewith.

* * * * *